May 15, 1934.  L. O. GRONDAHL  1,959,161
FREQUENCY RESPONSIVE APPARATUS
Filed March 29, 1933

INVENTOR
Lars O. Grondahl.
BY
HIS ATTORNEY

Patented May 15, 1934

1,959,161

UNITED STATES PATENT OFFICE 1,959,161

FREQUENCY RESPONSIVE APPARATUS

Lars O. Grondahl, Pittsburgh, Pa., assignor to The Union Switch & Signal Company, Swissvale, Pa., a corporation of Pennsylvania Application March 29, 1933, Serial No. 663,348

9 Claims. (Cl. 171—119)

My invention relates to frequency responsive apparatus, and particularly to apparatus responsive to variations of the frequency of an alternating current generator for maintaining the frequency of the generator substantially constant.

I will describe two forms of apparatus embodying my invention, and will then point out the novel features thereof in claims.

Figure 1:
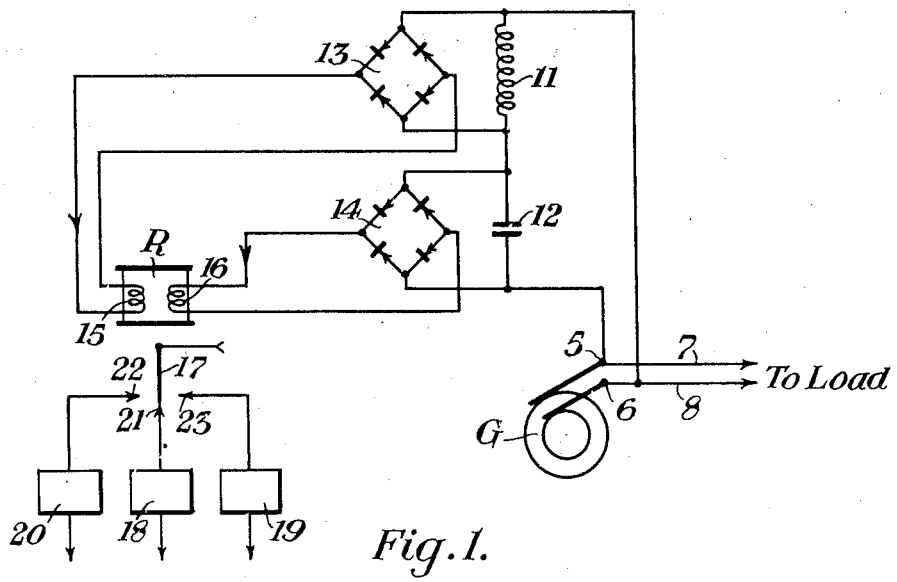
Figure 2:
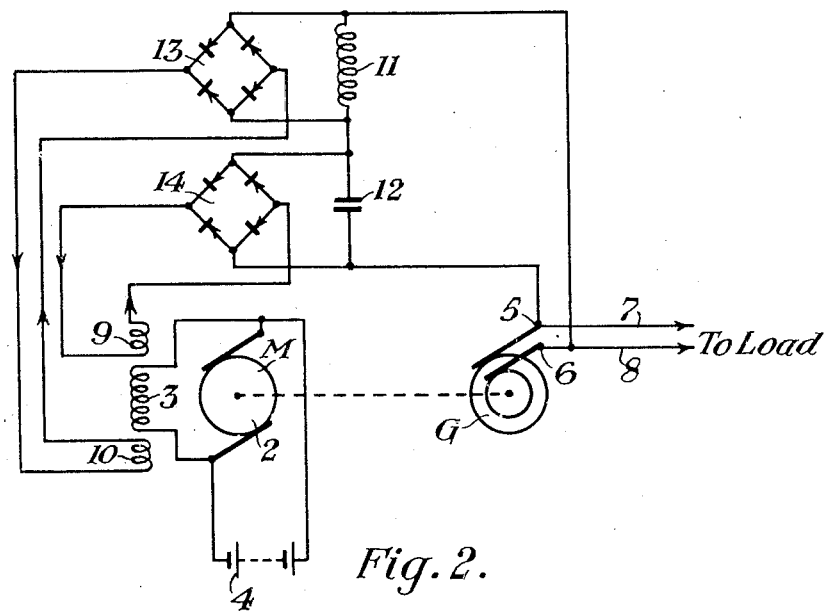

A feature of my invention is the provision of novel and improved apparatus responsive to variations of the frequency of an alternating current. A further feature of my invention is the provision of apparatus for controlling the speed of the driving unit of an alternating current generator in response to variations of the frequency of the alternating current output. Other features and advantages of my invention will be apparent from the following description when taken in connection with the accompanying drawing of which Fig. 1 is a diagrammatic view of one form of apparatus embodying my invention, and wherewith a relay is controlled by variations of the frequency of an alternating current. Fig. 2 is a diagrammatic view of a second form of apparatus embodying my invention, and wherewith the speed of a motor driving an alternating current generator is controlled by variations of the frequency of the alternating current output of the generator.

In each of the views like reference characters designate similar parts.

Referring to Fig. 1, the reference character G designates a generator of alternating current of any convenient frequency, such, for example, as 60 cycles per second. The output of the generator G is supplied to any desired load, not shown, over two conductors 7 and 8. Across the terminals 5 and 6 of the generator G is connected a tuned circuit comprising an inductor 11 and a condenser 12 in series. The whole or a portion of the inductor 11 is connected with the input terminals of a full-wave rectifier 13, the output terminals of which are connected with the opposite terminals of the winding 15 of a relay R. The terminals of the condenser 12 are connected with the input terminals of a second full-wave rectifier 14, the output terminals of which are connected with the opposite terminals of a second winding 16 of the relay R as will be readily understood by an inspection of Fig. 1. The rectifiers 13 and 14 may be any one of several types comprising asymmetrical units adapted to pass current readily in one direction and to substantially block the flow of current in the opposite direction. Preferably the rectifiers 13 and 14 comprise the well known copper oxide rectifying units arranged in the customary full-wave arrangement. The windings 15 and 16 of relay R are so arranged that the magnetic fields created thereby, in response to current flowing in the direction indicated by the arrows, oppose each other. Relay R is provided with an armature 17 biased to a central position, that is, to the position illustrated in the drawing. It follows that when the magnetic fields created by windings 15 and 16 are of equal strength they will cancel and the armature 17 is held in engagement with a contact 21. When the magnetic field created by winding 15 predominates, the resultant field causes the armature 17 to be shifted to the left-hand position where it engages a contact 22. When the field created by the winding 16 predominates, the resultant magnetic field causes the armature 17 to be shifted to the right to engage a contact 23. The armature 17 controls simple circuits for governing the electroresponsive devices 18, 19 and 20 in accordance with its three different positions.

The tuned circuit comprising inductor 11 and condenser 12 will preferably be tuned to resonance at the normal frequency of the generator G, which I have referred to as being 60 cycles per second. The tuning of this circuit, however, is not critical and it may have a resonant frequency somewhat above or somewhat below the normal frequency of the generator if it should seem desirable. The reason for this variation in the tuning of the circuit including inductor 11 and condenser 12 will appear when the operation of the apparatus is described.

Assuming first that the tuned circuit is tuned to resonance at the normal frequency of the alternating current and that the reactor 11 and condenser 12 have negligible ohmic resistance, sufficient resistance being assumed to be present in the remainder of the circuit to prevent short circuiting of generator G, then the voltage drop across the inductor 11 will be equal to the voltage drop across the condenser 12. Under this condition, the voltage impressed on the input terminals of the rectifier 13 will be equal to the voltage impressed on the input terminals of the rectifier 14, and hence the rectifier current flowing in the windings 15 and 16 of relay R will be equal and in the direction indicated by the arrows. The windings 15 and 16 in this case would be of an equal number of turns and as they are arranged to have their respective magnetic fields opposite each other, the resultant magnetic field will now be zero, and the armature 17 will be held in its biased position to control the device 18. That is to say, the armature 17 of relay R is held in a position to control the device 18 as long as normal frequency is impressed on the tuned circuit. In the event the frequency of generator G becomes higher than the normal frequency, the inductive reactance of inductor 11 will be increased and the capacity reactance of condenser 12 will be decreased. The result will be that the voltage drop across inductor 11 becomes greater than the voltage drop across condenser 12, and hence the voltage impressed on the input terminals of the rectifier 13 will now be greater than the voltage impressed on the input terminals of the rectifier 14. The higher voltage now impressed on the rectifier 13 will cause the current flow in the winding 15 to be greater than the current flow in the winding 16 and the resultant magnetic field will shift the armature 17 into engagement with the contact 22 to control the device 20. In the event the frequency of generator G drops below the normal frequency, the inductive reactance of inductor 11 will decrease and the capacity reactance of condenser 12 will increase with the result that the voltage drop across the condenser 12 will be greater than the voltage drop across the inductor 11. Under this condition, the higher voltage impressed on the rectifier 14 will cause the current flow in the winding 16 to be greater than the current flow in the winding 15 and the armature 17 will be shifted toward the right to engage the contact 23 to control the device 19.

It is clear from the above that with the series tuned circuit tuned to resonance at the normal frequency, the voltage drop across inductor 11 and condenser 12 is equal at the normal frequency, and rectified currents of equal strength will be supplied to the two windings 15 and 16 causing thereby the resultant magnetic field to be zero. A frequency above the normal frequency increases the voltage drop across inductor 11 and decreases the voltage drop across condenser 12. This unbalanced condition of the voltage drops in turn results in the rectified current supplied to the winding 15 being greater than the current supplied to the winding 16, and a resultant magnetic field is established having a direction corresponding with that of winding 15. A decrease in the frequency of the alternating current below the normal frequency also unbalances the voltage drop of the series tuned circuit but this time the drop across condenser 12 is the larger and the current supplied to the winding 16 is greater than that supplied to the winding 15 with the result that there now exists a resultant magnetic field in the direction corresponding to winding 16. That is to say, the variations of the voltage drop across the inductor 11 and the condenser 12 created by variations of the frequency of the alternating current cause a corresponding difference in the rectified current supplied to the two windings 15 and 16, and the difference of current flow creates a resultant magnetic field which is utilized to indicate frequency variations. It is apparent that the preferred condition of the tuned circuit is that by which a large variation of voltage drop across the inductor 11 and condenser 12 results from a given variation of frequency.

As stated hereinbefore, the tuned circuit comprising inductor 11 and condenser 12 may be so proportioned and adjusted as to be tuned to resonance at some frequency above or below the normal frequency. Under this arrangement of the tuned circuit, the voltage drop across the inductor 11 and the condenser 12 will be unequal at the normal frequency, and hence the voltage impressed on the input terminals of the two rectifiers 13 and 14 will normally be unequal. The rectified current supplied to the two windings 15 and 16 will now also be unequal. The windings 15 and 16 would in this case be so proportioned with unequal number of turns or adjustment that their normal magnetic fields would cancel leaving the armature 17 of relay R normally held in its biased position in response to normal frequency impressed on the tuned circuit. With this arrangement, variations of frequency above or below the normal frequency will cause corresponding variations in the voltage drop across inductor 11 and condenser 12. These voltage variations will be reflected in the resultant magnetic fields of windings 15 and 16 in a manner similar to that described when the tuned circuit was adjusted to resonance at the normal frequency.

The electroresponsive devices 18, 19 and 20 may be made to indicate the condition of the frequency of the generator G, or they may be made to control the speed of the driving unit for generator G in such a manner that the frequency of the generator is maintained substantially constant. Referring to Fig. 2, there is disclosed a preferred manner for governing the speed of the driving unit of an alternating current generator by variations of the frequency of the output of the generator. The reference character M designates a shunt wound direct current motor comprising an armature 2 and a main field winding 3. The armature 2 and the field winding 3 are connected in multiple with a source of direct current such, for example, as a battery 4. The motor M is also provided with two auxiliary field windings 9 and 10. The auxiliary windings 9 and 10 are preferably similar and are arranged in such a manner that when excited by current flowing in the directions indicated by the arrows, the magnetic fields created thereby oppose each other.

Generator G of Fig. 2 is mechanically coupled to the motor M and hence is driven thereby. The terminals 5 and 6 of generator G are connected over the wires 7 and 8 with any desired load the same as in Fig. 1. It follows that as long as the motor M is supplied with current from the battery 4, the generator G is driven at a predetermined speed of rotation to deliver an alternating current of a given normal frequency. Variations of voltage of battery 4 sufficient to cause a change in the speed of the motor M will, in turn, cause a change in the frequency of the alternating current delivered by generator G. Variations in the load consumed by conductors 7 and 8 may also effect a change in the speed of motor M which, in turn, will cause a change in the frequency of the alternating current.

To maintain a constant speed of rotation of the motor M, and, consequently, substantially a constant frequency of the alternating current, the field of the motor M is controlled by variations of the frequency of the output of the generator G. The tuned circuit comprising the inductor 11 and the condenser 12 is connected across the output terminals of the generator G to receive a small proportion of the generated power the same as disclosed in Fig. 1. The rectifiers 13 and 14 have their respective input terminals connected across the inductor 11 and the condenser 12 in the same manner as described for Fig. 1. The output terminals of the rectifier 13 are connected with the auxiliary winding 10 of motor M, and the output terminals of rectifier 14 are connected with the auxiliary winding 9 of motor M. The parts of the tuned circuit and the associated auxiliary windings 9 and 10 are so proportioned and adjusted that at the given normal frequency of the alternating current, the magnetic fields created by the windings 9 and 10 cancel one another as far as their effect on the field motor M is concerned. If the motor speed increases so that the frequency of the alternating current is too high, the voltage across the inductor 11 is greater and the voltage across the condenser 12 is less than at the normal frequency with the result that the current supplied to the auxiliary winding 10 becomes greater than the current supplied to the auxiliary winding 9. Under this condition, the field created by the winding 10 is greater than the field created by the winding 9 leaving a resultant magnetic field in the direction corresponding to that of winding 10. The winding 10 is wound so as to create a field to assist the field created by the main winding 3. Consequently, the motor field is increased as the result of the increase in the frequency of the generator G and this increase in the field strength of motor M results in a decrease in its speed to decrease the frequency of the alternating current, bringing it back to its given normal frequency. If on the other hand, the motor speed decreases so that the frequency of the alternating current of generator G is too low, the voltage across the inductor 11 decreases and the voltage across the condenser 12 increases with the result that the current flowing in the winding 9 is now greater than that flowing in the winding 10. The magnetic field created by winding 9 is now greater than that created by winding 10, and being reversed to that of winding 10, it is also reverse to the field created by the main winding 3. Consequently at the low frequency of the alternating current, the field intensity of the motor M is decreased and its speed is correspondingly increased to restore the frequency of the alternating current to normal value.

Frequency responsive apparatus such as here disclosed is simple, easily adjusted, and effective. When applied to the control of a driving unit for an alternating current generator, it provides regulation on both sides of the desired frequency, maintaining the frequency of the alternating current substantially constant.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a generator of alternating current having a given normal frequency, a tuned circuit comprising an inductor and a condenser in series and connected across the terminals of said generator, a first circuit including a full-wave rectifier and a first winding and connected across said inductor, a second circuit including a full-wave rectifier and a second winding and connected across said condenser, and means controlled jointly by said first and second windings for regulating the speed of said generator.

2. In combination, a source of alternating current having a given normal frequency, a tuned circuit comprising an inductor and a condenser in series and connected across said current source, a first full-wave rectifier having its input terminals connected across said inductor, a second full-wave rectifier having its input terminals connected across said condenser, a first winding connected to the output terminals of the first rectifier, a second winding connected to the output terminals of the second rectifier, said first and second windings arranged in such a manner that their magnetic fields oppose and cancel when normal frequency is impressed on the tuned circuit, and electro-responsive means controlled by the resultant magnetic field of said windings whereby it is made to assume one condition when a frequency above the normal frequency is impressed on the tuned circuit and is made to assume a second condition when a frequency below the normal frequency is impressed on the tuned circuit.

3. In combination, a source of alternating current having a given normal frequency, a tuned circuit comprising an inductor and a condenser in series and connected across said current source, a first full-wave rectifier having its input terminals connected across said inductor, a second full-wave rectifier having its input terminals connected across said condenser, a first winding connected to the output terminals of the first rectifier, a second winding connected to the output terminals of the second rectifier, said first and second windings arranged in such a manner that their magnetic fields oppose and cancel when normal frequency is impressed on the tuned circuit, whereby a resultant magnetic field corresponding to that of the first winding is created when a frequency above the normal frequency is impressed on said tuned circuit and a resultant magnetic field corresponding to that of the second winding is created when a frequency below the normal frequency is impressed on the tuned circuit, and electro-responsive means controlled by the resultant magnetic fields.

4. In combination, a generator of alternating current of a predetermined frequency, a tuned circuit comprising an inductor and a condenser in series and tuned to resonance at said predetermined frequency, said tuned circuit connected in parallel with the output of said generator, a motor having a main field winding and a first and a second auxiliary field winding, a current source for exciting said main field winding, a first full-wave rectifier having its input connected across said inductor and its output connected with the first auxiliary winding for exciting that winding, a second full-wave rectifier having its input connected across said condenser and its output connected with the second auxiliary winding for exciting that winding, and said motor field windings arranged in such a manner that an increase in frequency causes an increase in the resultant motor field to reduce its speed and a decrease in frequency decreases the motor field to increase its speed.

5. In combination, a generator of alternating current, a direct current motor for driving said generator at a given speed to generate a predetermined frequency, said motor having a main field winding and a first and a second auxiliary field winding with the first auxiliary winding adapted to add its effect to that of the main winding and the second auxiliary winding adapted to subtract its effect from that of the main winding, a tuned circuit comprising an inductor and a condenser in series connected across the terminals of the generator, a first circuit including a rectifier and said first auxiliary winding connected across the inductor, a second circuit including a rectifier and said second auxiliary winding connected across the condenser, whereby variations in the voltage drop across said inductor and condenser caused by variations of the frequency of said generator above or below the predetermined frequency cause a change in the motor field to maintain its speed substantially constant.

6. In combination, a generator of alternating current, a driving unit having a normal speed of rotation for operating said generator at a given speed to generate a predetermined frequency, a tuned circuit comprising an inductor and a condenser in series and connected across the terminals of said generator, a first circuit including an asymmetrical conductor and a first winding connected with said inductor and arranged to be influenced by the voltage drop across said inductor, a second circuit including an asymmetrical conductor and a second winding connected with said condenser and arranged to be influenced by the voltage drop across said condenser; said first and second windings arranged in such a manner that the magnetic fields created thereby oppose and cancel when said predetermined frequency is impressed on the tuned circuit, the field of the first winding predominates when the frequency impressed on the tuned circuit is above the predetermined frequency and the field of the second winding predominates when frequency below the predetermined frequency is impressed on the tuned circuit; and means controlled by the magnetic fields of said windings for governing the speed of the driving unit.

7. In combination, a generator of alternating current of a given normal frequency, a direct current motor having a main field winding and a first and a second auxiliary field winding for driving the generator, a tuned circuit comprising an inductor and a condenser in series connected across the terminals of said generator, a first circuit including a rectifier and said first auxiliary winding connected across said inductor and adapted to add the magnetic effect of said auxiliary winding to that of the main winding, a second circuit including a rectifier and said second auxiliary winding connected across said condenser and adapted to subtract the magnetic effect of said auxiliary winding from that of the main winding, said first and second circuits arranged in such a manner that the magnetic effects of the first and second windings cancel when normal frequency is impressed on the tuned circuit whereby too high a frequency of said generator strengthens the motor field to decrease its speed and too low a frequency of the generator weakens the motor field to increase its speed.

8. In combination, an alternating current generator having a given normal frequency, a tuned circuit energized from said generator and comprising an inductor and a condenser connected in series, a first winding connected across said inductor, a second winding connected across said condenser, and means controlled jointly by said first and second windings for regulating the frequency of said generator.

9. In combination, an alternating current generator having a given normal frequency, a reactor and a condenser energized from said generator and adjusted for approximate series resonance at the normal frequency of said generator thereby establishing reactor and condenser voltage drops which are approximately balanced at said normal frequency, and means responsive to the relative magnitudes of said reactor and condenser voltage drops for increasing or decreasing the frequency of said generator according as said condenser or said reactor voltage drop respectively is predominant.

LARS O. GRONDAHL.